United States Patent [19]

Griswold, Jr.

[11] 3,717,493
[45] Feb. 20, 1973

[54] PRODUCTION OF PHTHALOCYANINE PIGMENT
[75] Inventor: Paul H. Griswold, Jr., Wilmington, Del.
[73] Assignee: E. I. du Pont de Nemours and Company, Wilmington, Del.
[22] Filed: Feb. 1, 1971
[21] Appl. No.: 111,618

[52] U.S. Cl..............................106/288 Q, 106/309
[51] Int. Cl. ................................................C08h 17/14
[58] Field of Search..........106/288 Q, 309; 260/314.5

[56] References Cited

UNITED STATES PATENTS 2,225,302  12/1940  Hartwell ..........................106/288 B

OTHER PUBLICATIONS

Koike et al., Kogyo Kagaku Zasshi, 57, No. 11: 828–830, 1954.

Primary Examiner—James E. Poer
Attorney—Donald A. Hoes

[57] ABSTRACT

A metal phthalocyanine pigment composed almost exclusively of the $\alpha$ I polymorph is prepared by a process in which crude metal phthalocyanine is converted to the corresponding tetrahydrosulfate followed by controlled crystal growth and hydrolysis.

2 Claims, No Drawings

PRODUCTION OF PHTHALOCYANINE PIGMENT

BACKGROUND OF THE INVENTION

Phthalocyanine pigments are well known in the art and have been prepared by several known prior art methods. The best known and most widely used of these methods is the reacting of phthalic anhydride, anhydrous cupric chloride, and urea, using a catalyst such as ammonium molybdate. The crude reaction mixtures always contain excess metalliferous reactant and organic by-products from which the purified phthalocyanine pigment must be separated.

The general procedures which are present most useful in the preparation of phthalocyanine in purified pigmentary form from the crude phthalocyanine comprise the following steps of operation: (1) crude phthalocyanine derived from processes such as referred to above is reacted with concentrated sulfuric acid under conditions which result in formation of a solution of phthalocyanine sulfate; (2) the thus-formed sulfate solution is hydrolyzed by reaction with water to yield pigmentary phthalocyanine. It is known that the conditions under which each of these two steps is carried out will be reflected in the particle size and crystal character of the pigment, hence in the quality of the pigment.

It has also been known, from X-ray powder studies, that crystal modifications exist for copper phthalocyanine, the $\alpha$, $\beta$, $\gamma$ and $\Delta$ forms having been reported. As these crystal modifications exhibit somewhat different properties, e.g. tint and intensity of color, it is desirable to achieve a pigmentary product which is composed almost exclusively of one crystal modification.

SUMMARY OF THE INVENTION

I have discovered that the so-called $\alpha$ I polymorph (see B. Honigmann, Journal of Paint Technology, Vol. 38, No. 493, pp. 77–84) is an especially valuable pigmentary form of phthalocyanine and that a product composed almost exclusively thereof can be obtained by careful control of conditions leading to the formation and hydrolysis of a phthalocyanine tetrahydrosulfate intermediate.

More particularly the process of the invention comprises the consecutive steps of:

1. dissolving crude metal phthalocyanine, either chlorinated or not, in concentrated sulfuric acid of at least 96 percent by weight $H_2SO_4$, a convenient weight ratio being about one part of the crude phthalocyanine to from 8.5 to 9.5 parts of the acid;

2. rapidly diluting the solution of step (1) with water or dilute sulfuric acid in a first-stage mixing zone, the dilution being effected to provide a liquid-phase acid concentration of about 64 to about 82 percent by weight and a temperature of about 86° to 140°C., whereby the phthalocyanine is precipitated almost exclusively as the corresponding phthalocyanine tetrahydrosulfate;

3. holding the phthalocyanine tetrahydrosulfate within the first-stage mixing zone for a time to achieve crystal growth to within a particle size range of 0.01 to 0.2 $\mu$;

4. discharging the resultant slurry from the first-stage mixing zone directly into a second-stage mixing zone and effecting rapid dilution with water to a liquid-phase acid concentration below about 40 percent by weight;

5. subjecting the slurry product of step (4) to a conditioning to complete crystal growth and perfection; and 6. recovering the phthalocyanine pigment from the diluted slurry.

The above described process yields a high quality phthalocyanine pigment in a form which is readily useable in commercial application.

On the basis of numerous experiments with a three-component system of copper phthalocyanine, sulfuric acid, and water, I have been able to establish that an initial dilution of copper phthalocyanine in concentrated sulfuric acid to an acid concentration above about 64 percent by weight results in preferential formation of the tetrahydrosulfate salt. Further experimentation has shown that this tetrahydrosulfate can then be hydrolyzed under conditions such that the copper phthalocyanine which results is the desirable $\alpha$ I polymorph. Dilution to acid concentrations less than about 64 percent by weight results in formation of the dihydrosulfate or an even lower hydrosulfate.

If the initial dilution is made to an acid concentration higher than about 82 percent by weight, some of the crude copper phthalocyanine remains dissolved in the sulfuric acid rather than forming a hydrosulfate. X-ray diffraction analyses have shown that this dissolved portion, when reacted with water in the subsequent hydrolysis step, precipitates from the more dilute acid as the less desirable $\alpha$ II polymorph.

To carry out the process of this invention, crude metal phthalocyanine obtained by any prior art method, for example U.S. Pat. No. 2,197,458, is completely dissolved in concentrated sulfuric acid (96–100 percent) in the weight ratio of about one part of crude metal phthalocyanine to about 8.5 to 9.5 parts of acid. The resultant sulfuric acid solution of crude material is pumped into a first-stage mixer where it is rapidly diluted with water or with additional dilute sulfuric acid solution. The quantities are controlled so that the sulfuric acid concentration of the resultant liquid phase in this first-stage mixing is from about 64 to 82 percent sulfuric acid. Within these concentration limits of acid, the metal phthalocyanine tetrahydrosulfate is formed almost exclusively, and the formation of other hydrosulfate forms is minimized. The dilution must be rapid in order to form the metal phthalocyanine tetrahydrosulfate in very small particle size. The temperature of the mix at this first stage of the operation should be maintained within the range of about 86° to 140°C., and preferably 110° to 135°C. A brief residence time, which may be as short as a fraction of a second, permits growth and development of crystals of the metal phthalocyanine hydrosulfate to the desired pigmentary particle size, more specifically to within the range of about 0.01 to 0.2 $\mu$. It will be understood that temperature, residence time, acid concentration, and degree of chlorination of the pigmentary material will have an effect upon particle size of the tetrahydrosulfate, and that those skilled in the art will be able to select a combination of conditions best suit the circumstances. Thus under those conditions involving use of temperatures in the lower part of the range, i.e. 86°C., an acid concentration in the lower part of the range, i.e. 64 percent, and using a copper phthalocyanine of higher degree of chlorination, crystal growth is relatively slow such that a longer holding time, i.e. up to 15 minutes, is needed in the first-stage mixer to achieve suitable crystal growth; that is, such that particles are within the range of 0.01 $\mu$ to 0.2$\mu$. Conversely, with a higher temperature, i.e. 140°C., more concentrated acid, i.e. 82 percent, and a chlorine-free copper phthalocyanine, growth of crystals to within the desired pigmentary range will be quite rapid and the holding time can consequently be very short.

At the conclusion of the desired residence time in the first-stage mixer, the slurry is forwarded to a second mixer where it is diluted with enough water, under high turbulence mixing, to lower rapidly the liquid-phase sulfuric acid to a concentration less than about 40 percent by weight. The lower limit of dilution and the residence time are not critical in this instance as it is merely necessary to lower the acid concentration below that point at which any particle growth can still take place while at the same time completely hydrolyzing the tetrahydrosulfate. The result is a metal phthalocyanine particle which, after conditioning to perfect the crystals, and separation from the acidic liquor, is particularly well suited for pigment uses.

In a preferred embodiment of the invention using non-chlorinated crude, a solution in sulfuric acid is diluted in the first stage to produce an acid concentration of about 74–76 percent at a temperature of about 125°–130°C.; under these conditions, optimum crystal growth and perfection will occur within a residence time of about 1.0 second. At lower acid concentrations higher residence periods are required or otherwise the product will comprise crystals that may be excessively small for some purposes. Some flexibility is possible, of course, in adjustment of temperature, acid concentrations and residence time, but the aforementioned preferred conditions are those found to be practical for operation of plant size equipment on a continuous basis.

In the first dilution step, the diluent used may be water or sulfuric acid of any concentration which will result in the conditions as described above. The advantage of using sulfuric acid instead of water is that usually better mixing is effected and smaller particle-size tetrahydrosulfate is obtained.

In the second dilution step, the effluent from the first-stage operation is diluted with water under rapid agitation to result in an acid concentration of less than about 40 percent and preferably less than 35 percent by weight. A temperature of about 90°–100°C. will normally be achieved in this step. The effluent from the second dilution contains the desired pigment which is conditioned by holding at a temperature near the boil for a time sufficient to effect crystal growth and perfection, then washed acid-free and held as a slightly ammoniacal press cake for subsequent pigment use.

An obvious economic advantage of the process of this invention is that it makes possible the use, without further treatment, of recycle acid filtrate at the concentration at which it is obtainable. Also, the possibility of continuous operation of the process is an evident economic advantage.

The preferred conditions which are given above for processing chlorine-free crude phthalocyanine pigment must be altered slightly for semichlor-phthalocyanine crude. In this case the preferred acid concentration within the first-stage mixer is about 74–75 percent by weight, and the temperature reached will be about 115° to 120°C. Semichlor-copper phthalocyanine tetrahydrosulfate is thereby obtained in the desired particle size range using a residence time in the first-stage mixer of about 3 seconds. The effluent from the second-stage dilution is conditioned by holding at an elevated temperature. Advantageously, this is accomplished in the presence of a surfactant or a surfactant plus an acid-stable, water immiscible organic solvent, such as perchloroethylene. Such a solvent may be subsequently eliminated by steam distillation. In any event, the pigment is filtered, washed acid-free, and held as a slightly ammoniacal press cake for subsequent use.

Unchlorinated or partially chlorinated metal phthalocyanines may be processed in accordance with the invention. The metal may be copper, nickel, or any other acid-stable metal phthalocyanine.

In order to describe more completely and specifically the process of this invention, the following examples are given. These are for purposes of illustration only and not in limitation of the invention. Parts and percentages therein are by weight unless otherwise specified.

EXAMPLE 1

This example describes the preparation of copper phthalocyanine pigment using partially chlorinated copper phthalocyanine crude to prepare a high-grade pigment product.

The crude partially chlorinated copper phthalocyanine is produced in a known manner by reacting phthalic anhydride, 4-chlorophthalic acid, urea, and copper chloride in the presence of catalyst in a kerosene medium to provide the crude product. The thus formed crude (solids content of about 12 percent) is flushed from the reaction medium into concentrated sulfuric acid using 1 part of crude copper phthalocyanine (100 percent CPC basis) to 9 parts of concentrated (98 percent) sulfuric acid.

The sulfuric acid solution of crude, partially chlorinated copper phthalocyanine at 30°C. is mixed under conditions of high turbulence at 245 psi with water at 30°C. The mixing in this first stage of operation is carried under conditions such that 4.42 gallons of acid solution of crude pigment is mixed into 1.62 gallons of water per minute. The reaction which takes place in the first-stage mixer under these described conditions results in the formation of semichlor copper phthalocyanine tetrahydrosulfate in an extremely small particle size. After a retention time of 2.6 seconds in the first-stage mixer, the particle size is within the range of 0.01 to 0.2 $\mu$ and a further dilution of the mixture is effected immediately. The acid concentration in this first-stage mixer is 74 percent and the temperature is 115°C.

The effluent (6.04 gal./min.) from the first-stage mixer is then rapidly mixed with 10.6 gallons of water per minute. The tetrahydrosulfate is immediately hydrolyzed under high turbulence to form pigmentary semichlor copper phthalocyanine, essentially all of which is in the $\alpha$ I phase. At this stage of the operation the sulfuric acid concentration of the mixture is found to be 35 percent, and the pigment concentration is 3.7 percent. Conditioning of the pigment is then facilitated by addition of 5 percent of a quaternary ammonium surfactant and 100 percent perchloroethylene (both percentages based on dry pigment weight) and heating just below the boiling point for 2 hours. The perchloroethylene is removed by steam distillation and the pigment, now substantially all in the α I form, is recovered by filtration and washing.

EXAMPLE 2

This example is carried out using chlorine-free copper phthalocyanine as the crude material.

Chlorine-free copper phthalocyanine is put into solution with 98 percent sulfuric acid in a 1:9 weight ratio. The solution, at 30°C., is then drowned in water, with rapid mixing, at a pressure of 190 psi. The mixing is carried out at such a rate that 4.42 gallons of acid solution of crude pigment is stirred into 2.1 gallons of water per minute, to obtain the copper phthalocyanine tetrahydrosulfate. The acid concentration of the liquid phase during this first stage mixing is 75 percent, and the temperature of the resultant mixture is 128°C. After a retention time of 1.0 second, a further dilution is effected by very rapidly mixing with water at the rate of 6.52 gallons effluent per 10.1 gallons of water per minute. The tetrahydrosulfate is rapidly hydrolyzed to form pigmentary chlorine-free phthalocyanine in the α I phase. The concentration of the effluent from the second stage mixer is 37 percent sulfuric acid and the pigment content is 3.7 percent by weight. After holding at 90° C. for 2 hours, the pigment is recovered by filtration and washing.

EXAMPLE 3

Crude nickel phthalocyanine is flushed into 9 parts by weight of 98 percent sulfuric acid for one part of phthalocyanine. This solution, at 30°C. is mixed under conditions of high turbulence at 200 psi with water at 30°C., in a ratio of 4.42 gallons of acid solution to 1.6 gallons water per minute. The resultant slurry of nickel phthalocyanine tetrahydrosulfate is 75 percent sulfuric acid at 130°C. The solution is held for 1.0 second in the first-stage mixer, and is then rapidly diluted in a second-stage mixer with 10.1 gallons of water to 6.02 gallons first-stage effluent per minute to produce a slurry of 3.6 percent pigment concentration and 34 percent sulfuric acid concentration. The pigment is conditioned as in Example 2 and recovered by filtration and washing and is held for further use as a slightly ammoniacal slurry. The pigmentary nickel phthalocyanine is essentially all in the α I phase.

What is claimed is:

1. In a process for the production of phthalocyanine pigment by the steps of preparing a solution of crude metal phthalocyanine in concentrated sulfuric acid, diluting said solution with water or acid to effect precipitation of phthalocyanine crystals, subjecting said crystals to a conditioning step to effect crystal growth and perfection, and recovering said phthalocyanine pigment, the improvement wherein said dilution step involves the continuous sequence of (1) rapidly diluting said sulfuric solution of crude phthalocyanine with water or with dilute sulfuric acid in a first-stage mixing zone, the dilution being effected to provide a liquid-phase acid concentration of about 64 to about 82 percent by weight and a temperature of about 86° to 140°C., whereby said phthalocyanine is precipitated almost exclusively as the corresponding phthalocyanine tetrahydrosulfate; (2) holding said phthalocyanine tetrahydrosulfate within said first-stage mixing zone for a brief period to generate particles within the size range of 0.01 to 0.2 $\mu$; (3) discharging the resultant slurry from said first-stage mixing zone directly into a second-stage mixing zone and effecting rapid dilution with water to a liquid-phase acid concentration below about 40 percent by weight.

2. The process of claim 1 in which the effluent from said second-stage mixing zone is subjected to a heat-treatment conditioning step to effect crystal growth and perfection in the phthalocyanine pigment.

* * * * *